US008765302B2

(12) United States Patent
Chen et al.

(10) Patent No.: US 8,765,302 B2
(45) Date of Patent: Jul. 1, 2014

(54) GRAPHENE-ENABLED VANADIUM OXIDE CATHODE AND LITHIUM CELLS CONTAINING SAME

(75) Inventors: Guorong Chen, Fairborn, OH (US);
Aruna Zhamu, Centerville, OH (US);
Bor Z. Jang, Centerville, OH (US);
Zhenning Yu, Fairborn, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 445 days.

(21) Appl. No.: 13/134,782

(22) Filed: Jun. 17, 2011

(65) Prior Publication Data
US 2012/0321953 A1    Dec. 20, 2012

(51) Int. Cl.
| | |
|---|---|
| H01M 4/13 | (2010.01) |
| H01M 10/052 | (2010.01) |
| H01M 4/587 | (2010.01) |
| C01G 31/02 | (2006.01) |
| H01M 4/485 | (2010.01) |
| H01M 4/58 | (2010.01) |
| H01M 4/36 | (2006.01) |
| B82Y 30/00 | (2011.01) |
| H01M 4/76 | (2006.01) |
| H01M 4/62 | (2006.01) |
| H01M 4/48 | (2010.01) |
| C01G 31/00 | (2006.01) |
| H01M 4/02 | (2006.01) |

(52) U.S. Cl.
CPC ...... *H01M 10/052* (2013.01); *H01M 2004/028* (2013.01); *H01M 4/587* (2013.01); *C01P 2004/03* (2013.01); *C01G 31/02* (2013.01); *Y02E 60/122* (2013.01); *C01P 2004/24* (2013.01); *H01M 4/485* (2013.01); *H01M 4/5825* (2013.01); *H01M 4/362* (2013.01); *C01P 2004/17* (2013.01); *B82Y 30/00* (2013.01); *H01M 4/76* (2013.01); *H01M 4/625* (2013.01); *C01P 2004/61* (2013.01); *H01M 4/483* (2013.01); *C01P 2006/40* (2013.01); *C01G 31/00* (2013.01)
USPC ................... 429/219; 429/231.95; 429/231.7; 429/231.8

(58) Field of Classification Search
USPC ........................ 429/219, 231.95, 231.7, 231.8
See application file for complete search history.

(56) References Cited

U.S. PATENT DOCUMENTS

| 2,798,878 | A | 7/1957 | Hummers |
| 2009/0246625 | A1* | 10/2009 | Lu ................................ 429/207 |

OTHER PUBLICATIONS

U.S. Appl. No. 12/009,259, filed Jan. 18, 2008, A. Zhamu, et al.
U.S. Appl. No. 12/156,644, filed Jun. 4, 2008, J. Shi, et al.

(Continued)

*Primary Examiner* — Jane Rhee

(57) ABSTRACT

A nano graphene-enabled vanadium oxide composite composition for use as a lithium battery cathode active material, wherein the composite composition is formed of one or a plurality of graphene, graphene oxide, or graphene fluoride sheets or platelets and a plurality of nano-particles, nano-rods, nano-wires, nano-sheets, and/or nano-belts of a vanadium oxide with a size smaller than 100 nm (preferably smaller than 20 nm, further preferably smaller than 10 nm, and most preferably smaller than 5 nm), and wherein the graphene, graphene oxide, or graphene fluoride (having a thickness <20 nm, preferably <10 nm, further preferably <5 nm, and being most preferably of single-layer or less than 5 layers) is in an amount of from 0.01% to 50% (preferably <10%) by weight based on the total weight of graphene, graphene oxide or graphene fluoride and the vanadium oxide combined. This electrode material exhibits an unprecedented combination of outstanding specific capacity, capacity retention, and rate capability characteristics.

27 Claims, 8 Drawing Sheets

(56) References Cited

OTHER PUBLICATIONS

U.S. Appl. No. 12/315,555, filed Dec. 4, 2008, A. Zhamu, et al.
U.S. Appl. No. 12/319,812, filed Jan. 13, 2009, A. Zhamu, et al.
U.S. Appl. No. 12/655,172, filed Dec. 24, 2009, A. Zhamu, et al.
U.S. Appl. No. 12/807,471, filed Sep. 7, 2010, A. Zhamu, et al.
A. Pan, "Nanosheet-structured LiV3O8 with high capacity and excellent stability for high energy lithium batteries," J. Materials Chem., DOI: 10.1039/c1jm10976f.
D. A. Semenenko, et al,"LixV2O5 nanobelts for high capacity lithium-ion battery cathodes," Electrochemistry Communications, 12 (2010) 1154-1157.
Q. Shi, High-Capacity LiV3O8 Thin-Film Cathode with a Mixed Amorphous-Nanocrystalline Microstructure Prepared by RF Magnetron Sputtering, Electrochem. Comm 2009, 11, 2169-72.
Y. Feng, A New Low-temperature Synthesis and Electrochemical Properties of LiV3O8 Hydrate as Cathode Material for Lithium-Ion Batteries, J. Power Sources, 2009, 192, 708-713.
A. Pan, Template Free Synthesis of LiV3O8 Nanorods as a Cathode Material for High-Rate Secondary Lithium Batteries, J. Mater. Chem., 2011, 21, 1153-1161.
J. Xu, Influence of Heat-Treat Temp on Crystal Structure, Morphology and Electrochem. Prop. of LiV3O8 Prepared by Hydrothermal Reaction, J. Alloys Compd., 2007, 467, 327-331.
J. G. Xie, J. X. Li, H. Zhan and Y. H. Zhou, Low-temperature Sol-gel Synthesis of Li1.2V3O8 from V2O5 Gel, Mater. Lett., 2003, 57, 2682-2687.
J. Sun, Preparation and Electrochemical Performance of AgxLi1-xV3O8, J. Alloys Compd., 2009, 472, 363-366.
S. H. Ng, Flame Spray-pyrolyzed Vanadium Oxide Nanoparticles for Lithium Battery Cathodes, Phys. Chem. Chem. Phys., 2009, 11, 3748-3755.
S. Y. Chew, Low-Temperature Synthesis of Polypyrrole-Coated LiV3O8 Composite with Enhanced Electrochemical Properties, J. Electrochem. Soc., 2007, 154, A633-A637.
N. Tran, Spray-drying Synthesis and Electrochem Perfor. of Lithium Vanadates as Positive Electrode Materials for Li Batteries, J. Electrochem. Soc., 2008, 155, A384-A389.
H. Liu, Synthesis and Electrochem. Prop. of Single-Crystalline LiV3O8 Nanorods as Cathode Materials for Rechargeable Lithium Batteries, J. Power Sources, 2009, 192, 668-673.
A. Sakunthala, Prep, Charact., Electrochem. Perfor. of Li Trivanadate Rods by a Surfactant-Assisted Poly. Precursor Method for Li Batt J. Phys. Chem. C, 2010, 114, 8099-8107.
W. Wu, "Synthesis and electrochemical properties of single-crystalline LiV3O8 nanobelts for rechargeable lithium batteries," Materials Letters, 65 (2011) 2155-2157.
S. Gao, "Single crystal nanobelts of V3O7•H2O: A lithium intercalation host with a large capacity," Electrochimica Acta, 54 (2009) 1115-1118.
Y. Ding, Preparation of nano-structured LiFePO4/graphene composites by co-precipitation method, Electrochem. Commun., 12 (2010) 10-13.
X. Zhou, Graphene modified LiFePO4 cathode materials for high power lithium ion batteries, J. Mater. Chem., 2011, 21, 3353.
C. Ban, "Electrospun nano-vanadium pentoxide cathode," Electrochemistry Communications 11 (2009) 522-525.
S. Qiao, Synthesis of V3O7 H2O nanobelts as cathode materials for lithium-ion batteries, Electrochemistry Communications 8 (2006) 21-26.

* cited by examiner

GRAPHENE-ENABLED VANADIUM OXIDE CATHODE AND LITHIUM CELLS CONTAINING SAME

FIELD OF THE INVENTION

The present invention relates generally to the field of lithium metal or lithium ion batteries and, in particular, to a nano graphene-enhanced vanadium oxide cathode of a lithium battery (including lithium metal battery and lithium-ion battery).

BACKGROUND OF THE INVENTION

Most of the current cathode materials in lithium-ion batteries exhibit a specific capacity significantly lower than 200 mAh/g (e.g., 140 mAh/g for $LiCoO_2$). One exception is vanadium-based materials (e.g. $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$) that exhibit exceptional specific capacity due to their ability to incorporate more than one lithium ion per vanadium atom. For example, a specific discharge capacity of 442 mAh/g [Ref.1] was obtained when three lithium ions intercalate into $V_2O_5$. Nanometer thick $Li_xV_2O_5$ nano-belts with the δ-type crystal structure, synthesized by a hydrothermal treatment of $Li^+$-exchanged $V_2O_5$ gel, were found to exhibit a specific capacity of 490 mAh/g [Ref.2]. Lithium trivanadate ($LiV_3O_8$) is another vanadium oxide that also can accommodate several lithium ions per formula [Ref.3-5].

However, vanadium oxide-based materials have not been used to any significant extent in battery industry likely due to the following reasons:

(a) Electrochemical properties (e.g. specific capacity, capacity retention, and rate capability) are highly sensitive to vanadium oxide synthesis and electrode fabrication conditions. A high specific capacity, high capacity retention upon repeated charges/discharges, and/or high rate capability (ability to possess a high capacity at a high charge/discharge rate) have not been consistently achieved.

(b) In those cases of a high first-cycle capacity (e.g. >300 mAh/g), the capacity typically decays very rapidly upon repeated charges/discharges. Reasonable capacity retention could only be achieved with those compositions that exhibit an initial specific capacity <<270 mAh/g (however, this value is lower than the highest reported value by 45%). As demonstrated in Table 1 below, it has been difficult to find a vanadium oxide composition that exhibits a capacity >270 mAh/g and good capacity retention (e.g. >90% of the first-cycle capacity after 100 cycles) in a half-cell configuration (i.e., using lithium foil as a counter electrode). A pressing need exists for a vanadium oxide-based material with both high discharge capacity and good capacity retention beyond 100 cycles.

(c) The specific capacity of this class of cathode materials is highly sensitive to the charge/discharge rate, exhibiting a dramatic decrease in capacity with just a minor or moderate rate increase. Even with a nano-structure (nano-particle, nano-rod, nano-wire, nano-sheet, or nano-belt), these vanadium-based cathodes still fall short in terms of providing a good capacity at a high rate (i.e. they exhibit poor rate capability).

TABLE 1

Specific capacity and capacity retention of various vanadium oxide-based cathode materials as a function of current density (rate) and cycle number.

| Synthesis Method (Ref. No.) | Composition | Current density (mA/g) | Capacity, mAh/g (cycle number) | Capacity retention (%) |
|---|---|---|---|---|
| Hydrothermal (6) | $LiV_3O_8$ | 120 | 212.8 (1) → 152 (18) | 72 |
| Sol-gel (7) | $Li_{1.2}V_3O_8$ | 60 | 281 (2) → 200 (40) | 71 |
| Sol-gel (8) | $Li_{0.96}Ag_{0.04}V_3O_8$ | 150 | 328 (1) → 252.7 (50) | 77 |
| Flame pyrolysis (9) | $LiV_3O_8$ nanoparticles | 100 | 271 (1) → 180 (90) | 66 |
| Solution process (10) | $LiV_3O_8$-PP composite | 40 | 184 (1) → 183 (50) | 99 |
| Spray drying (11) | $Li_{1.1}V_3O_8$ | 116 | 260 (2) → 220 (60) | 84 |
| Hydrothermal (12) | $LiV_3O_8$ nano-rod | 100 | 247 (1) → 236 (100) | 96 |
| Surfactant-assisted polymer precursor (13) | $LiV_3O_8$ nano-rod | 120 | 182 (2) → 180 (60) | 99 |
| Soft chemistry (5) | $LiV_3O_8$ nano-rod | 100 | 320 (2) → 250 (100) | 78 |
| Chelating and PEG-modifying (1) | $LiV_3O_8$ nano-sheets prepared at different temperatures | 100 | 260 (2) → 262 (100) | 100 |
|  |  | 100 | 194 (2) → 181 (100) | 93 |
|  |  | 100 | 166 (2) → 157 (100) | 94 |
| Hydrothermal (2) | $Li_xV_2O_5$ nano-belts, >5-15 nm thick | 20 | 490 (1) → 405 (50) | 83 |
|  |  | 100 | 400 (5) → 370 (25) | 92 |
| Solid state reaction (14) | $LiV_3O_8$ nano-belts, 20 nm thick | 20 | 356 (1) → 298.6 (30) | 84 |
|  |  | 50 | 274 (1) → 234.5 (30) | 85 |
|  |  | 100 | 234 (1) → 195.5 (30) | 84.5 |
| Hydrothermal (15) | $Li_xV_3O_7 \cdot H_2O$ (x = 4.32); nano belts, 30 nm thick | 20 | 409 (1) → 260 (20) | 64 |
|  |  | 100 | 340 (1) → 240 (20) | 71 |
|  |  | 1000 | 270 (1) → 170 (20) | 63 |
|  |  | 10000 | 100 (1) → 50 (20) | 50 |
| Electro-spinning and hydrothermal (24) | $Li_xV_2O_5$ nano-belts, 10-20 nm thick | 0.1 A/cm² | 350 (1) → 240 (20) | 69 |

TABLE 1-continued

Specific capacity and capacity retention of various vanadium oxide-based cathode materials as a function of current density (rate) and cycle number.

| Synthesis Method (Ref. No.) | Composition | Current density (mA/g) | Capacity, mAh/g (cycle number) | Capacity retention (%) |
|---|---|---|---|---|
| Hydrothermal (25) | $V_3O_7 \cdot H_2O$, nano belts, 20 nm thick | 30 | 253 (1) → 228.6 (50) | 90 |

List of References Cited:

(1) Anqiang Pan, Ji-Guang Zhang, Guozhong Cao, Shuquan Liang, Chongmin Wang, Zimin Nie, Bruce W. Arey, Wu Xu, Dawei Liu, e Jie Xiao, Guosheng Li and Jun Liu, "Nanosheet-structured $LiV_3O_8$ with high capacity and excellent stability for high energy lithium batteries," J. Materials Chem., DOI: 10.1039/c1jm10976f.

(2) Dmitrii A. Semenenko, Daniil M. Itkis, Ekaterina A. Pomerantseva, Eugene A. Goodilin, Tatiana L. Kulova, Alexander M. Skundin, Yurii D. Tretyakov, "$Li_xV_2O_5$ nanobelts for high capacity lithium-ion battery cathodes," Electrochemistry Communications, 12 (2010) 1154-1157.

(3) Q. Shi, R. Z. Hu, L. Z. Ouyang, M. Q. Zeng and M. Zhu, High-Capacity $LiV_3O_8$ Thin-Film Cathode with a Mixed Amorphous-Nanocrystalline Microstructure Prepared by RF Magnetron Sputtering, Electrochem. Commun., 2009, 11, 2169-2172.

(4) Y. Feng, F. Hou and Y. Li, A New Low-temperature Synthesis and Electrochemical Properties of $LiV_3O_8$ Hydrate as Cathode Material for Lithium-Ion Batteries, J. Power Sources, 2009, 192, 708-713.

(5) A. Pan, J. Liu, J.-G. Zhang, G. Cao, W. Xu, Z. Nie, X. Jie, D. Choi, B. W. Arey, C. Wang and S. Liang, Template Free Synthesis of $LiV_3O_8$ Nanorods as a Cathode Material for High-Rate Secondary Lithium Batteries, J. Mater. Chem., 2011, 21, 1153-1161.

(6) J. Xu, H. Zhang, T. Zhang, Q. Pan and Y. Gui, Influence of Heat-Treatment Temperature on Crystal Structure, Morphology and Electrochemical Properties of $LiV_3O_8$ Prepared by Hydrothermal Reaction, J. Alloys Compd., 2007, 467, 327-331.

(7) J. G. Xie, J. X. Li, H. Zhan and Y. H. Zhou, Low-temperature Sol-gel Synthesis of $Li_{1.2}V_3O_8$ from $V_2O_5$ Gel, Mater. Lett., 2003, 57, 2682-2687.

(8) J. Sun, L. Jiao, H. Yuan, L. Liu, X. Wei, Y. Miao, L. Yang and Y. Wang, Preparation and Electrochemical Performance of $Ag_xLi_{1-x}V_3O_8$, J. Alloys Compd., 2009, 472, 363-366.

(9) S.-H. Ng, T. J. Patey, R. Buchel, F. Krumeich, J.-Z. Wang, H. Liu, S. E. Pratsinis and P. Novak, Flame Spray-pyrolyzed Vanadium Oxide Nanoparticles for Lithium Battery Cathodes, Phys. Chem. Chem. Phys., 2009, 11, 3748-3755.

(10) S. Y. Chew, C. Feng, S. H. Ng, J. Wang, Z. Guo and H. Liu, Low-Temperature Synthesis of Polypyrrole-Coated $LiV_3O_8$ Composite with Enhanced Electrochemical Properties, J. Electrochem. Soc., 2007, 154, A633-A637.

(11) N. Tran, K. G. Bramnik, H. Hibst, J. Prolss, N. Mronga, M. Holzapfel, W. Scheifele and P. Novak, Spray-drying Synthesis and Electrochemical Performance of Lithium Vanadates as Positive Electrode Materials for Lithium Batteries, J. Electrochem. Soc., 2008, 155, A384-A389.

(12) H. Liu, Y. Wang, K. X. Wang, Y. R. Wang and H. S. Zhou, Synthesis and Electrochemical Properties of Single-Crystalline $LiV_3O_8$ Nanorods as Cathode Materials for Rechargeable Lithium Batteries, J. Power Sources, 2009, 192, 668-673.

(13) A. Sakunthala, M. V. Reddy, S. Selvasekarapandian, B. V. R. Chowdari and P. C. Selvin, Preparation, Characterization, and Electrochemical Performance of Lithium Trivanadate Rods by a Surfactant-Assisted Polymer Precursor Method for Lithium Batteries, J. Phys. Chem. C, 2010, 114, 8099-8107.

(14) Weizhong Wu, Jie Ding, Hongrui Peng, Guicun Li, "Synthesis and electrochemical properties of single-crystalline $LiV_3O_8$ nanobelts for rechargeable lithium batteries," Materials Letters, 65 (2011) 2155-2157.

(15) Shaokang Gao, Zhanjun Chen, Mingdeng Wei, Kemei Wei, Haoshen Zhou, "Single crystal nanobelts of $V_3O_7 \cdot H_2O$: A lithium intercalation host with a large capacity," Electrochimica Acta, 54 (2009) 1115-1118.

(16) Aruna Zhamu and Bor Z. Jang, "Hybrid Nano Filament Cathode Compositions for Lithium Ion and Lithium Metal Batteries," U.S. patent application No. 12/009,259 (Jan. 18, 2008).

(17) Jinjun Shi, Aruna Zhamu and Bor Z. Jang, "Conductive Nanocomposite-based Electrodes for Lithium Batteries," U.S. patent application No. 12/156,644 (Jun. 04, 2008).

(18) Aruna Zhamu, Bor Z. Jang, and Jinjun Shi, "Nano Graphene Reinforced Nanocomposite for Lithium Battery Electrodes," U.S. patent application No. 12/315,555(Dec. 04, 2008).

(19) Aruna Zhamu, Bor Z. Jang, and Jinjun Shi, "Process for Producing Nano Graphene Reinforced Nanocomposite for Lithium Battery Electrodes," U.S. patent application No. 12/319,812 (Jan. 13, 2009).

(20) A. Zhamu and Bor Z. Jang, "Conductive Graphene Polymer Binder for Electrochemical Cell Electrodes," U.S. patent application No. 12/655,172 (Dec. 24, 2009).

(21) Aruna Zhamu, Jinjun Shi, Guorong Chen, M. C. Wang, and Bor Z. Jang, "Graphene-Enhanced Cathode Particulates for Lithium Batteries," U.S. patent application No. 12/807,471 (Sep. 07, 2010).

(22) Y. Ding, et al. "Preparation of nano-structured $LiFePO_4$/graphene composites by co-precipitation method," Electrochemistry Communications, 12 (2010) 10-13.

(23) Xufeng Zhou, Feng Wang, Yimei Zhu, and Zhaoping Liu, "Graphene modified $LiFePO_4$ cathode materials for high power lithium ion batteries," J. Mater. Chem., 2011, 21, 3353.

(24) Chunmei Ban, Natalya A. Chernova, M. Stanley Whittingham, "Electrospun nano-vanadium pentoxide cathode," Electrochemistry Communications 11 (2009) 522-525.

(25) Hui Qiao, Xianjun Zhu, Zhi Zheng, Li Liu, Lizhi Zhang, "Synthesis of $V_3O_7$ $H_2O$ nanobelts as cathode materials for lithium-ion batteries," Electrochemistry Communications 8 (2006) 21-26.

Further, due to extremely poor electrical conductivity of all cathode active materials in a lithium-ion or lithium metal cell, a conductive additive (e.g. carbon black, fine graphite particles, expanded graphite particles, or their combinations), typically in the amount of 5%-15%, must be added into the electrode. However, the conductive additive is not an electrode active material. The use of a non-active material means that the relative proportion of an electrode active material, such as vanadium oxide, is reduced or diluted. For instance, the incorporation of 5% by weight of PVDF as a binder and 10% of carbon black as a conductive additive in a cathode would mean that the maximum amount of the cathode active material is only 85%, effectively reducing the total lithium ion storage capacity. Since the specific capacities of the more commonly used cathode active materials are already very low (140-170 mAh/g), this problem is further aggravated if a significant amount of non-active materials is used to dilute the concentration of the active material.

State-of-the-art carbon black (CB) materials, as a conductive additive, have several drawbacks: (a) CBs are typically available in the form of aggregates of multiple primary particles that are typically spherical in shape. Due to this geometric feature (largest dimension-to-smallest dimension ratio or aspect ratio ~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths. (b) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for a more effective electrically conductive additive material. Preferably, this electrically conductive additive is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

There have been several attempts to use other carbon nano-materials than carbon black (CB) or acetylene black (AB) as a conductive additive for the cathode of a lithium battery. These include carbon nano-tubes (CNTs), vapor-grown carbon nano-fibers (VG-CNFs), and simple carbon coating on the surface of cathode active material particles. The result has not been satisfactory and hence, as of today, carbon black and artificial graphite particles are practically the only two types of cathode conductive additives widely used in lithium ion battery industry. The reasons are beyond just the obvious high costs of both CNTs and VG-CNFs. The difficulty in disentangling CNTs and VG-CNFs and uniformly dispersing them in a liquid or solid medium has been an impediment to the more widespread utilization of these expensive materials as a conductive additive. For the less expensive carbon coating, being considered for use in lithium iron phosphate, the conductivity of the carbon coating (typically obtained by converting a precursor such as sugar or resin via pyrolyzation) is relatively low. It would take a graphitization treatment to render the carbon coating more conductive, but this treatment requires a temperature higher than 2,000° C., which would degrade the underlying cathode active material.

Instead of following the CNT, CNF, or carbon coating approaches, our research groups have invented several different approaches [Ref. 16-21] that make use of nano graphene platelets (NGPs) as a critical ingredient in a cathode. The NGP in these earlier reports refers to single-layer or multi-layer graphene or graphene oxide sheets (having an oxygen content of 0-46% by weight). These earlier approaches developed by us include:
1) Using NGP as a substrate to support a cathode active material coating [Ref. 16];
2) Using NGP as a 3-D network of graphene-based conducting pathways with cathode active particles bonded thereto via a conductive binder [Ref. 17];
3) Using NGP as a reinforcing agent for a matrix (e.g. carbon matrix) with cathode active material particles dispersed in graphene sheet-reinforced carbon matrix [Ref 18 and 19];
4) Using NGP as a graphene-based conductive binder polymer (to replace non-conductive polymer, such as PVDF and PTFE) due to graphene's surprisingly high adhesive power [Ref. 20]; and
5) Using NGP as an encasing agent that embraces an aggregate of cathode active material particles to form graphene nano-nodules for improved cathode conductivity [Ref 21].

Since the discovery of the graphene-based approaches by our research group, there has been increasing interest in following these approaches. For instance, Ding, et al investigated the electrochemical behavior of LiFePO$_4$/graphene composites [Ref 22], which is essentially a variant of our earlier work [Ref 16]. Zhou, et al [Ref 23] also made use of the concept of 3-D graphene network as proposed by us in [Ref. 17].

However, no prior work has been reported on using graphene, graphene oxide, or graphene fluoride sheets to modify, regulate, control, or tailor-make the structure, morphology, shapes, and sizes of various vanadium oxide compositions to achieve a high specific capacity, stable cycling behavior (high capacity retention percentage), and/or high rate capability (high capacity at high charge/discharge rates, e.g., >3 C or even >20 C rate). In battery industry, 1 C means completing the charge or discharge procedure in 1 hour and n C means completing the charge or discharge procedure in (1/n) hours (20 C means completing the procedure in 1/20 hours or 3 minutes). No prior art has taught about the graphene-vanadium oxide composites prepared by precipitating vanadium oxide-type cathode material in the presence of graphene, graphene oxide, or graphene fluoride sheets. These sheets are herein surprisingly found to have totally altered the structure, morphology, shapes, and dimensions of the vanadium oxide nano-structure and, hence, have dramatically improved the electrochemical properties of vanadium oxide, reaching unprecedented levels of performance in terms of first-cycle capacity, capacity retention (cycle stability), and/or high-rate capability.

Thus, the objects of the present invention are to:
(A) Provide a vanadium oxide-based cathode active material that consistently exhibits a combination of excellent electrochemical properties (e.g. a combination of good specific capacity, capacity retention, and rate capability, not just one type of good property).
(B) Provide a vanadium oxide-based cathode active material that exhibits a high first-cycle capacity (e.g. >300 mAh/g) and an ability to maintain a high capacity for a long cycle life (e.g. >90% retention after >100 charge/discharge cycles or >80% retention after >200 cycles). By 90% retention we mean maintaining 90% of the original specific capacity after a specified number of cycles.
(C) Provide a vanadium oxide-based cathode active material that exhibits a high specific capacity even at a high C rate (e.g., >400 mAh/g at 1 C, >350 mAh/h at 2.5 C, and/or >300 mAh/g at >10 C). These high specific capacities at such high charge/discharge rates have not been achieved in the lithium-ion battery industry.
(D) Provide a vanadium oxide-based cathode active material that exhibits a nano-structure (nano-particle, nano-rod, nano-wire, nano-sheet, or nano-belt) having a dimension (e.g. average thickness) smaller than 10 nm, preferably smaller than 5 nm. Although Semenenko et al [Ref 2] reported Li$_x$V$_2$O$_5$ nano-belts having a thickness range of 5-15 nm, the average thickness is exactly equal to 10 nm (not <10 nm).
(E) Provide a vanadium oxide-based composite material that is more thermally and electrically conductive than the corresponding vanadium oxide alone.
(F) Provide a vanadium oxide-based composite material composed of multiple primary particles of vanadium oxide that, in combination with graphene, graphene oxide, or graphene fluoride sheets, and an optional carbon material, are aggregated into secondary particles (herein referred to as particulates) that are more amenable to the production of cathodes having a good tap density using current production equipment. This is significant since it is very difficult to fabricate electrodes directly from primary nano-scaled particles of electrode-active materials. Also, non-spherical particles normally lead to electrodes with a low tap density (electrode weight/electrode volume). In other words, the tap density of the presently invented composite material is higher than that of vanadium oxide particles when used alone (without graphene, graphene oxide, or graphene fluoride) in an electrode.
(G) Provide a conductive additive or modifier that is capable of helping multiple primary particles of a vanadium oxide material aggregate into secondary particles that contain a 3-D network of electron-conducting paths, imparting exceptional conductivity to the cathode, and enabling the cathode to become high-rate capable.

(H) Provide a vanadium oxide-based composite material wherein graphene, graphene oxide, or graphene fluoride sheets serve as heterogeneous nucleation sites to encourage nucleation of crystals from a large number of sites (i.e. to promote nucleation as opposed to growth of vanadium oxide crystals), resulting in the formation of vanadium oxide crystals in the form of nanoparticle, nano-rod, nano-wire, nano-belt, or nano-sheet having a size (e.g. average thickness) smaller than 30 nm, preferably smaller than 20 nm, further preferably smaller than 10 nm, and most preferably smaller than 5 nm.

SUMMARY OF THE INVENTION

The present invention provides a nano graphene-enabled vanadium oxide composite composition for use as a lithium battery cathode active material. The composite composition is formed of one or a plurality of graphene, graphene oxide, or graphene fluoride sheets or platelets (collectively referred to as nano graphene platelets or NGPs) and a plurality of nano-particles, nano-rods, nano-wires, nano-tubes, nano-sheets, and/or nano-belts of a vanadium oxide with a size smaller than 100 nm, and wherein NGPs, having a thickness in the range of 0.34 nm-20 nm, are in an amount of from 0.01% to 50% by weight based on the total weight of NGPs and the vanadium oxide combined.

The amount of graphene material (graphene, graphene oxide, or graphene fluoride) is preferably from 0.1% to 20% (further preferably between 0.1% and 10%) by weight of the total weight of the graphene material and vanadium oxide combined. Preferably, the graphene material comprises single-layer or few-layer graphene, graphene oxide, or graphene fluoride wherein the few-layer graphene, graphene oxide, or graphene fluoride is defined as a platelet formed of less than 10 graphene planes. In the composite composition, graphene oxide may have an oxygen content less than 25% by weight, preferably less than 10% by weight, and most preferably less than 5% by weight. With mostly single-layer or few-layer graphene sheets, we have found that typically less than 5% by weight and more typically less than 2% by weight is sufficient to achieve the desired composite properties. With the presence of graphene, the use of other conductive additives (e.g. carbon black) during the electrode fabrication stage can be significantly reduced or totally eliminated.

Preferably, the nano-particles, nano-rods, nano-wires, nano-tubes, nano-sheets, and/or nano-belts of vanadium oxide have an average thickness or diameter smaller than 10 nm. Further preferably, nano-particles, nano-rods, nano-wires, nano-tubes, nano-sheets, and/or nano-belts of a vanadium oxide have a size smaller than 5 nm. The vanadium oxide is preferably in a form of nano-sheet or nano-belt having a thickness smaller than 20 nm, further preferably smaller than 10 nm, and most preferably smaller than 5 nm.

The vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. The doped versions may contain a dopant selected from the group consisting of alkali metals, alkaline earth metals, transition metals, other metals selected from Al, Ga, In, Sn, Pb, and Bi, metalloids selected from B, Si, Ge, As, Sb, and Te, halogens, and other non-metals selected from C, N, P, S, and Se. Particularly desired vanadium oxides are $V_2O_5$, $Li_xV_2O_5$, $V_3O_8$, $Li_xV_3O_8$, and their doped versions.

In a preferred composite composition, the vanadium oxide and graphene, graphene oxide, or graphene fluoride sheets are mutually bonded or agglomerated into a composite particulate with at least a graphene, graphene oxide, or graphene fluoride sheet embracing or wrapping around the particulate, and wherein the particulate has an electrical conductivity no less than $10^{-4}$ S/cm, preferably greater than $10^{-2}$ S/cm. Preferably, the particulate is spherical in shape.

The composite composition may further comprise a carbon material in electronic contact with the vanadium oxide and a graphene, graphene oxide, or graphene fluoride sheet. The carbon material may be coated on vanadium oxide, wherein the carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

The present invention also discloses a process for producing the composite composition. As an example, the process comprises: (a) Preparing a solution of vanadium oxide in water or an organic solvent; (b) Preparing a suspension of graphene, graphene oxide, or graphene fluoride sheets or platelets dispersed in water or an organic solvent; (c) Mixing the vanadium oxide solution with the suspension to form a mixture suspension; and (d) Removing water or solvent, allowing vanadium oxide to precipitate on a surface of the graphene, graphene oxide, or graphene fluoride sheets.

The process may further comprise thermally and/or chemically converting the graphene oxide or graphene fluoride to graphene with an oxygen or fluorine content less than 5% by weight. In the composite composition production process, vanadium oxide preferably precipitates as multiple nano-particles, nano-rods, nano-wires, nano-tubes, nano-sheets, and/or nano-belts that are adhered to a surface of graphene, graphene oxide, or graphene fluoride. Preferably, vanadium oxide is nucleated from this surface to form a nano-particle, nano-rod, nano-wire, nano-sheet, or nano-belt that is adhered to the surface. Graphene surfaces are preferred sites of heterogeneous nucleation of vanadium oxide.

In another preferred embodiment, the composite composition is prepared from a process comprising: (a) Preparing a suspension of vanadium oxide nanoparticles, nano-rods, nano-wires, nano-tubes, nano-sheets, or nano-belts dispersed in water or an organic solvent with an optional surfactant dispersed therein; (b) Preparing a suspension of graphene, graphene oxide, or graphene fluoride sheets or platelets dispersed in water or an organic solvent; (c) Mixing the vanadium oxide suspension with the suspension of graphene, graphene oxide or graphene fluoride to form a mixture suspension; and (d) Removing water or solvent, allowing vanadium oxide to precipitate on a surface of graphene, graphene oxide, or graphene fluoride sheets. In this case, some or all of the vanadium oxide nanoparticles, nano-rods, nano-wires, nano-tubes, nano -sheets, or nano-belts are prepared separately or ahead of time, and are dispersed in water or solvent to form a suspension. The water or solvent may or may not contain vanadium oxide dissolved therein (in addition to those "dispersed" ones).

In the composition production processes discussed above, the step of removing water or solvent preferably comprises a step of drying the mixture suspension using an atomizing, aerosolizing, spray-drying, spray-pyrolysis, or fluidized-bed drying procedure. This procedure tends to result in the formation of substantially spherical particulates.

The present invention also provides a lithium battery cathode comprising the aforementioned composite composition as a cathode active material. One particularly desired cathode active material is a composite composition that exhibits (a) a specific capacity greater than 400 mAh/h for more than 100 charge/discharge cycles; or (b) a specific capacity greater than 300 mAh/h for more than 200 charge/discharge cycles.

Another preferred lithium battery electrode comprising the presently disclosed composite composition as a cathode active material, wherein the active material exhibits a specific capacity greater than 200 mAh/h (preferably >300 mAh/g) when measured at a current density of 10 A/g or a charge/discharge rate of 10 C.

The present invention also provides a lithium battery cathode comprising a cathode active material, wherein multiple composite particulates are packed together with the embracing graphene sheets forming a three-dimensional electron-conducting pathway.

The present invention also provides a lithium battery (including a lithium metal cell or lithium-ion cell) comprising an anode, a cathode as herein disclosed, a separator disposed between the anode and the cathode, and electrolyte in physical contact with both the anode and the cathode.

DETAILED DESCRIPTION OF PREFERRED EMBODIMENTS

Figure 1:
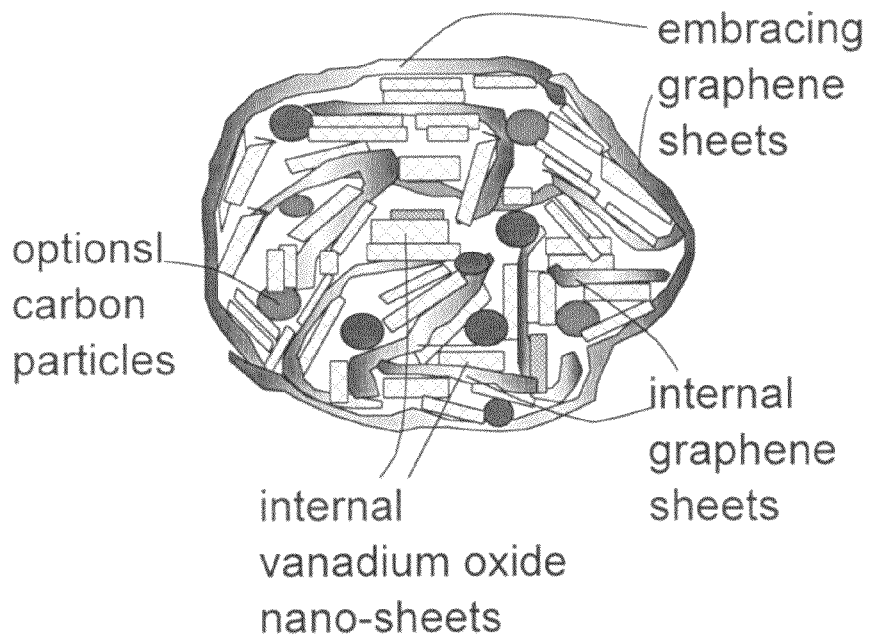
FIG. 1(A) Schematic of the internal structure of a graphene-enhanced vanadium oxide composite particulate (secondary particle) containing vanadium oxide nano-sheets (primary particles) according to a preferred embodiment of the present invention (containing optional carbon black particles or carbon coating); and (B) scanning electron micrograph of graphene-embraced vanadium oxide particulates. Graphene sheets embrace and protect the primary particles to form secondary particles (particulates) that are easier to handle in a real cathode production environment.
Figure 1:
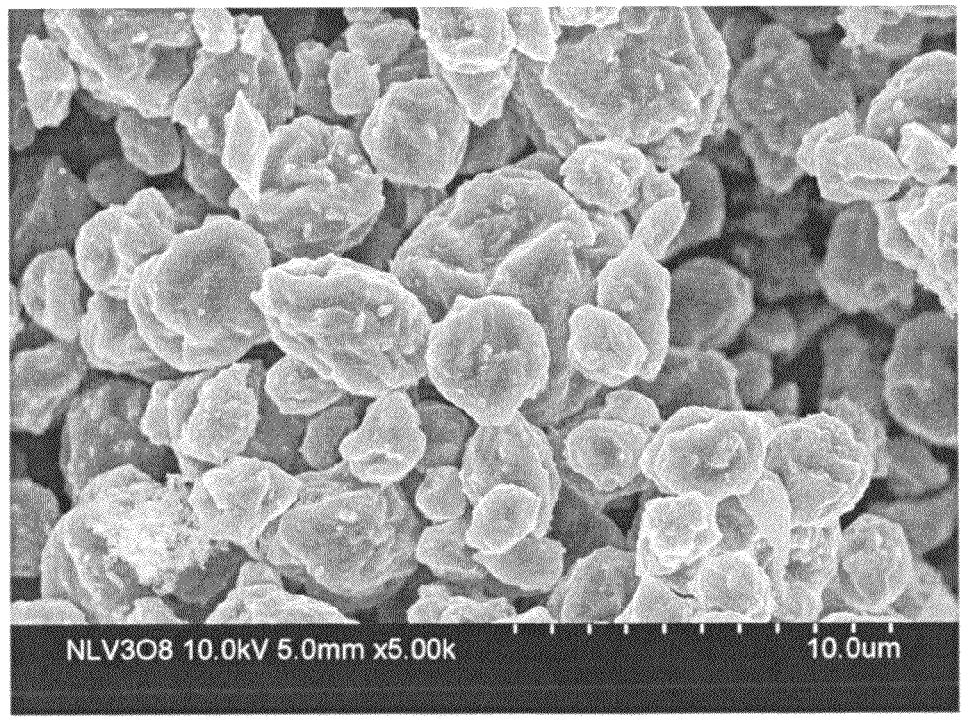

This invention provides a nano graphene-enhanced vanadium oxide composite composition for use as a lithium battery cathode active material. In a most preferred form, as illustrated in FIG. 1(A), the composite composition contains particulates that are each formed of a single or a plurality of graphene sheets (graphene, graphene oxide, graphene fluoride, or any derivative or functionalized version) and a plurality of fine cathode active material particles (primary particles) with a size smaller than 100 nm (preferably in the form of spherical nano particle, nano-rod, nano-wire, nano-tube, nano-sheet, or nano-belt). The graphene sheets and the primary particles are mutually bonded or agglomerated into a particulate (also referred to as a secondary particle) with at least a graphene sheet embracing the vanadium oxide primary particles. Some graphene sheets get incorporated into the interior of the particulate, providing additional electron-conducting paths. In another preferred embodiment of the present invention, an additional conductive additive (such as carbon black particles and/or carbon coating) is incorporated in the particulate. FIG. 1(B) is an SEM image of selected graphene-embraced lithium vanadium oxide nano-sheets.

Preferably, the nano-particles, nano-rods, nano-wires, nano-tubes, nano-sheets, and/or nano-belts of vanadium oxide have an average thickness or average diameter smaller than 10 nm. Further preferably, nano-particles, nano-rods, nano-wires, nano-tubes, nano-sheets, and/or nano-belts of a vanadium oxide have a size smaller than 5 nm. The vanadium oxide is preferably in a form of nano-sheet or nano-belt having a thickness smaller than 20 nm, further preferably smaller than 10 nm, and most preferably smaller than 5 nm. It is surprising that this could be readily achieved by dissolving vanadium oxide (or a precursor to vanadium oxide) in water (or other type of solvent) to form a solution, dispersing graphene (or a precursor to graphene, such as graphene oxide or graphene fluoride) in this solution, and then allowing vanadium oxide to precipitate out in the presence of graphene or graphene precursor sheets. This could be due to the surprising effect that graphene or graphene precursor sheets act as highly effective heterogeneous nucleation sites for vanadium oxide crystals. These sheets appear to promote nucleation as opposed to growth of vanadium oxide crystals. As a result, vanadium oxide crystals are significantly smaller in dimensions (not only shorter and narrower, but also thinner) when they are allowed to crystallize in the presence of graphene or graphene precursor sheets.

A wide variety of vanadium oxide may be used in combination with graphene, graphene oxide, or graphene fluoride sheets to make composite particulates. The vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. The doped versions may contain a dopant selected from the group consisting of alkali metals, alkaline earth metals, transition metals, other metals selected from Al, Ga, In, Sn, Pb, and Bi, metalloids selected from B, Si, Ge, As, Sb, and Te, halogens, and other non-metals selected from C, N, P, S, and Se. Particularly desired vanadium oxides are $V_2O_5$, $Li_xV_2O_5$, $V_3O_8$, $Li_xV_3O_8$, and their doped versions.

The production methods of various vanadium oxide materials have been discussed in [Refs. 1-15] cited earlier. However, after extensive research and development efforts, we have surprisingly observed that the presence of graphene, graphene oxide, or graphene fluoride sheets in a vanadium oxide solution always lead to a significant reduction in all dimensions of vanadium oxide crystallites, not only the lateral dimensions (length and width), but also the thickness (or diameter). This surprising result provides us with an additional tool to regulate the precipitation of vanadium oxide and obtain vanadium oxide structures (nanoparticles, nano-rods, nano-wires, nano-tubes, nano-sheets, and nano-belts) with desired dimensions (particularly, significantly reduced thickness or diameter). This in turn gives us the ability (that has been missing in the prior art) to design and fabricate vanadium oxide-based cathodes with a combination of exceptional specific capacity, cycling stability, and rate-capability (exhibiting high capacity even at high charge/discharge rates).

The resulting particulate typically has an electrical conductivity no less than $10^{-4}$ S/cm (typically and preferably greater than $10^{-2}$ S/cm). The graphene component is in an amount of from 0.01% to 50% by weight (preferably between 0.1% to 20% by weight, more preferably between 0.1% and 10%, and most preferably between 0.5% and 2%) based on the total weight of graphene and the vanadium oxide combined. When the processes herein invented involve using an atomization, aerosolizing, or spray-drying procedure, the particulates tend to be approximately spherical in shape, which is a desirable feature amenable to easy handling of resulting electrode paste or slurry for electrode coating or fabrication on a current collector. The resulting electrode, when dried, also exhibits a significantly high tap density.

A nano graphene platelet (NGP) or nano graphene sheet is composed of one basal plane of carbon atoms (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <20 nm, further preferably <10 nm, and most preferably <3 nm or 10 layers). The presently invented grapheme-enhanced particulate preferably contains mostly single-layer graphene, but could make use of some few-layer graphene (less than 10 layers). The graphene sheet may contain a small amount (typically <25% by weight) of non-carbon elements, such as hydrogen, fluorine, and oxygen, which are attached to an edge or surface of the graphene plane. The non-carbon content is preferably less than 10% by weight and most preferably less than 5% by weight before the graphene-vanadium oxide particulates are made into electrodes. Chemical or thermal reduction may be used to reduce the non-carbon content. Graphene was recently discovered to exhibit the highest thermal conductivity of all existing materials. In addition to the electrical conductivity, this high thermal conductivity is clearly an advantageous property that could not be achieved by any other type of conductive additives.

Graphene sheets may be oxidized to various extents during their preparation, resulting in graphene oxide (GO). Hence, in the present context, graphene preferably or primarily refers to those graphene sheets containing no or low oxygen content; but, they can include GO of various oxygen contents. Further, thin sheets of graphene or graphene oxide may be fluorinated to a controlled extent to obtain graphene fluoride sheets.

As a preferred embodiment, the process of producing the graphene-enhanced vanadium oxide composite composition comprises (i) preparing a vanadium oxide solution or suspension (containing (a) vanadium oxide or its precursor dissolved in a solvent or water, or (b) discrete vanadium oxide nanoparticles, nano-rods, nano-wires, nano-tubes, nano-sheets, or nano-belts dispersed in a solvent or water); (ii) dispersing graphene or graphene precursor in this vanadium oxide solution or suspension to form a mixture suspension; (iii) removing the solvent or water to form a composite composition; and optionally (iv) thermally and/or chemically converting the vanadium oxide precursor to become vanadium oxide, and/or converting graphene precursor to become graphene to obtain the desired graphene-enhanced vanadium oxide composite composition.

As an example, graphene or graphene oxide may be obtained with the following procedure:
(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms; and
(c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively,
(d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step.

A mixture suspension may be obtained by (e) dispersing a vanadium oxide or a precursor to vanadium oxide in the graphene or graphene precursor solution or suspension prepared in step (c) or step (d) to obtain a precursor mixture suspension; (f) drying the suspension to form the precursor mixture in a solid state; and (g) thermally and/or chemically converting the precursor mixture to the graphene-enhanced vanadium oxide composite composition. If the precursor mixture contains a precursor to vanadium oxide, the mixture will be thermally heated (sintered) to obtain the composite that contains primary vanadium particles therein. If the precursor mixture contains a graphene precursor (e.g. graphene oxide), then the precursor may be subjected to a chemical or thermal reduction treatment. A heat treatment at a temperature of preferably 500-1,000° C. for 1-2 hours would serve to eliminate a majority of the oxygen content from the graphene sheets. Coincidently, the thermal reduction of graphene oxide and the thermal sintering of some vanadium oxide precursor may be conducted concurrently under similar heat treatment conditions.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula H(CH$_2$)$_n$COOH, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), carbon black particles may be added along with vanadium oxide or its precursor. Alternatively, vanadium oxide (if already in the form of discrete nanoparticles, nano-rods, nano-wires, nano-tubes, nano-sheets, or nano-belts) may be coated with a thin layer of carbon before they are mixed with the graphene suspension. For instance, vanadium oxide may be mixed into a solution containing a carbon precursor (e.g. sugar in water or phenolic resin in a solvent). The liquid component is then removed from the resulting mixture suspension or paste to obtain sugar- or resin-coated vanadium particles. These coated particles are then heat-treated at a temperature of 500-1,000° C. to obtain carbon-coated particles. These particles are then added to the graphene solution or suspension.

Further alternatively, a carbon precursor may be added to the mixture suspension containing vanadium oxide (dissolved or dispersed in water or a solvent) and graphene, graphene oxide, or graphene fluoride sheets also dispersed in water or solvent. After removal of water or solvent, vanadium oxide will precipitate out as discrete particles (nanoparticles, nano-rods, nano-wires, nano-tubes, nano-sheets, or nano-belts) that are coated with the carbon precursor (e.g. a resin), and aggregated with and/or embraced by sheets of graphene, graphene oxide, or graphene fluoride. This carbon precursor is then thermally converted into a carbon phase.

Figure 2A:
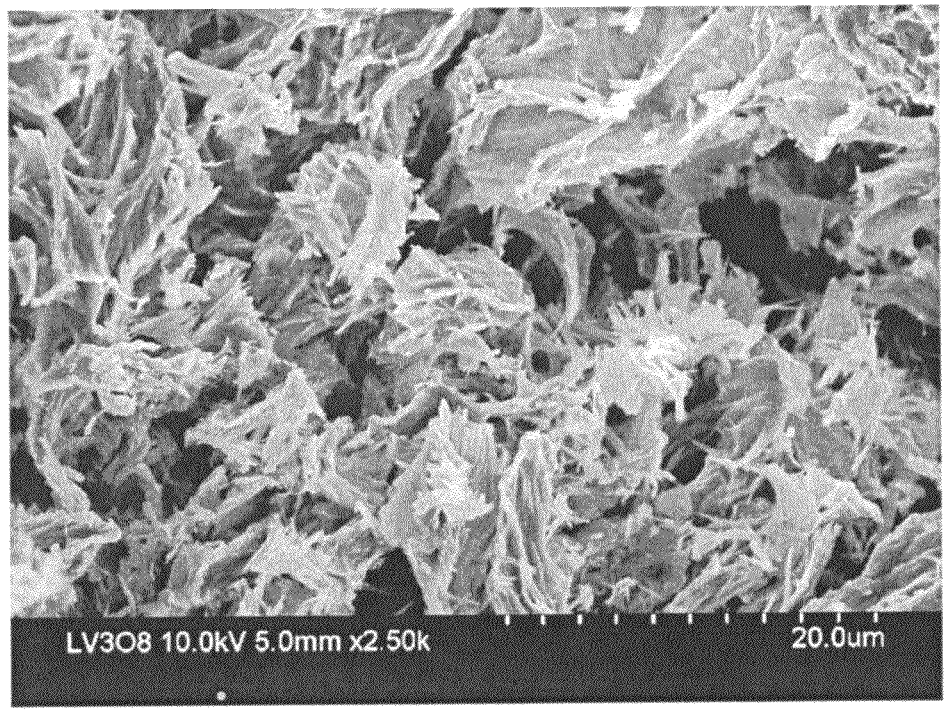
FIG. 2 SEM images of primary $LiV_3O_8$ particles without graphene: (A) at lower magnification and (B) at higher magnification. Particles are very large in all dimensions.
Figure 2B:
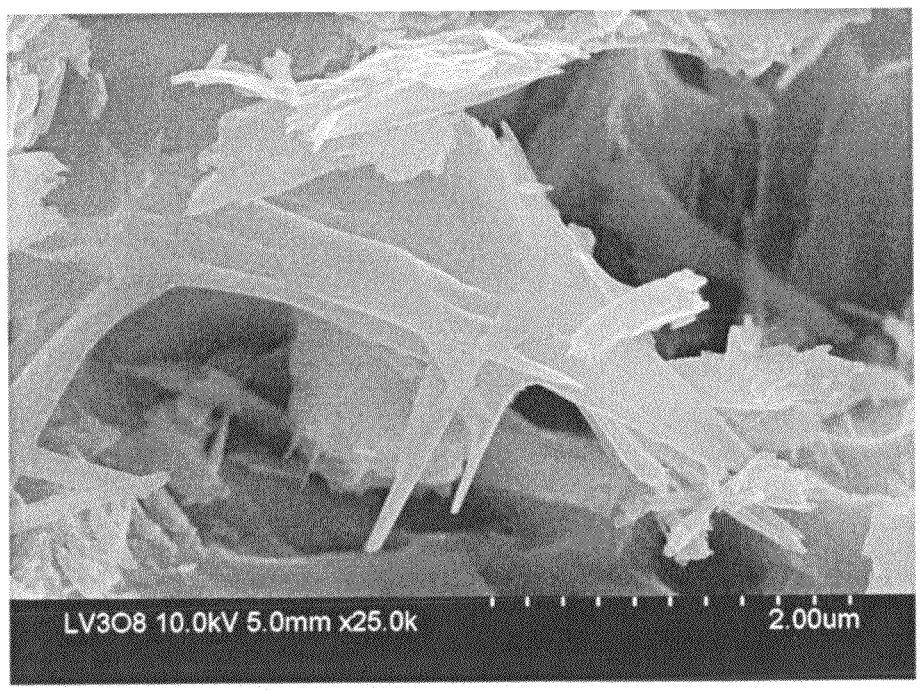
Figure 3A:
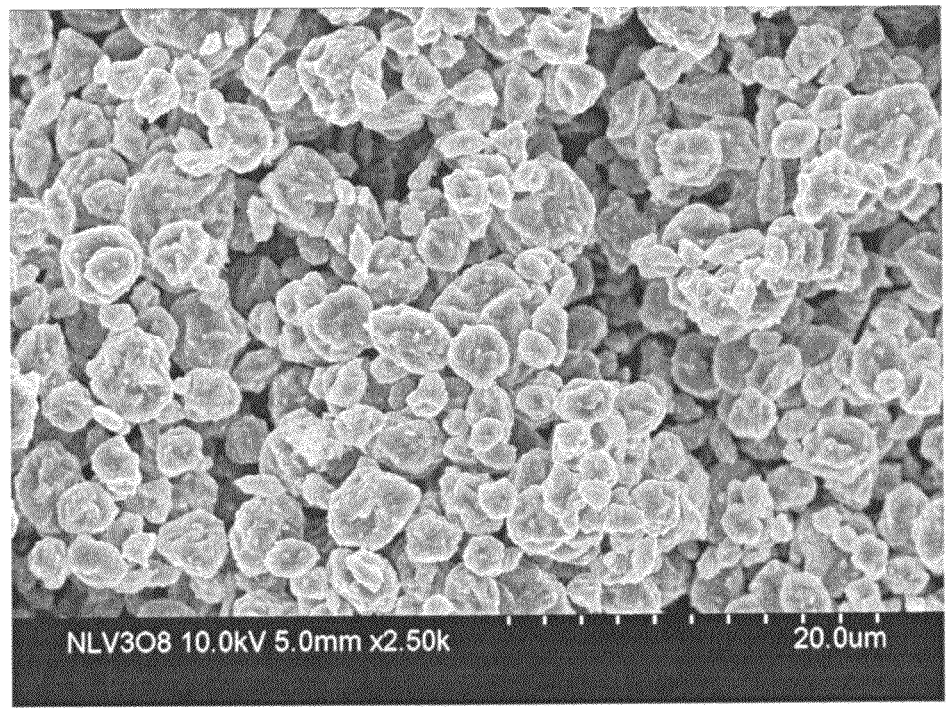
FIG. 3(A) SEM image of graphene-embraced $Li_xV_3O_8$ particulates, showing very uniform secondary particle sizes; (B) schematic of graphene-embraced particulates forming a 3-D network of electron-conducting paths.

FIGS. 2(A) and 2(B) shows a SEM image of primary LiV$_3$O$_8$ particles prepared without the presence of any graphene material. The particles are very large in dimensions and are largely irregular in shape. In contrast, FIGS. 1(B) and 3(A) show the corresponding graphene-enhanced vanadium oxide particulates comprising graphene sheets in and around the particulate, prepared under comparable conditions. Graphene sheets embrace and protect the primary particles to form secondary particles (particulates) that are easier to handle in a real cathode production environment. The secondary particles (composite particulates) that are more uniform in particle sizes and are larger in average size (~10 μm) than the primary particles. These particle sizes were conducive to electrode production using existing production equipment and were found to lead to cathodes that have a higher tap density (weight per volume of the electrode), which is a very important parameter for a cathode.

Figure 3B:
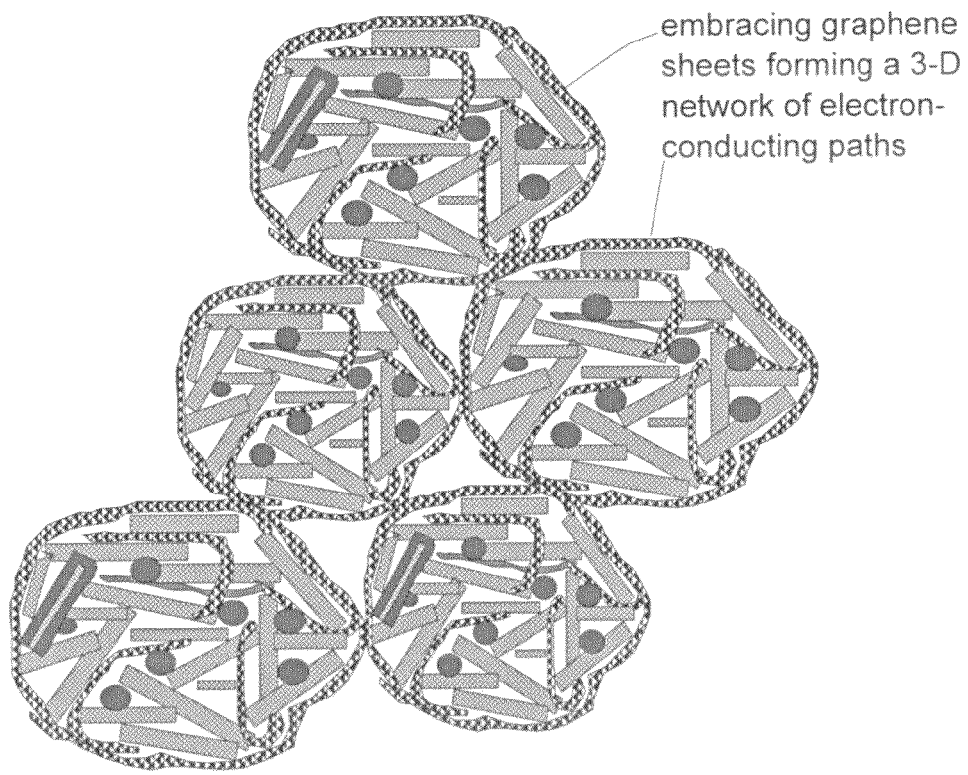

The notion that the exterior surface is embraced with highly conductive graphene sheets implies that these sheets can naturally form a 3-D network of electron-conducting paths when multiple particulates are packed together in a cathode (FIG. 3(B)).

As another preferred embodiment, the process may begin with the production of a precursor suspension of pristine graphene (non-oxidized and non-fluorized graphene) directly from graphite particles, which is followed by the addition of a vanadium oxide material to this suspension to obtain a precursor mixture suspension. The production of a precursor suspension may include the following steps:
(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));
(b) Optionally removing some of the liquid from the suspension;
(c) Adding a desired amount of a vanadium oxide or its precursor to obtain a precursor mixture suspension;
(d) Removing the liquid from the suspension to obtain a precursor mixture solid; and
(e) Thermally and/or chemically converting the precursor mixture solid to the graphene-enhanced vanadium oxide composite particulate.

For the preparation of a cathode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, lithium vanadium oxide particles embraced by graphene sheets may be added to a solution containing a solvent (NMP). The resulting paste may be coated onto an aluminum foil as a current collector to form a coating layer of 50-500 μm thick. By allowing the solvent to vaporize one obtains a positive electrode (cathode) for a lithium battery (either lithium metal cell or lithium-ion cell).

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, GO, and subsequently made exfoliated graphite, flexible graphite sheets, and graphene platelets, were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Graphene oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene suspension.

The presently invented processes typically resulted in nano graphene sheets that, when formed into a thin film with a thickness no greater than 100 nm, exhibits an electrical conductivity of at least 10 S/cm, often higher than 100 S/cm, and, in many cases, significantly higher than 1,000 S/cm. The resulting NGP powder material typically has a specific surface area of from approximately 300 m$^2$/g to 2,600 m$^2$/g and, in many cases, comprises single-layer graphene or few-layer graphene sheets.

When these graphene sheets are combined with a vanadium oxide material to form graphene-enhanced particulates, these particulates (when packed into a dry electrode) exhibit an electrical conductivity no less than 10$^{-4}$ S/cm (typically and preferably greater than 10$^{-2}$ S/cm). The graphene component is in an amount of from 0.01% to 50% by weight (preferably between 0.1% to 20% by weight and more preferably between 0.1% and 10%) based on the total weight of graphene and vanadium oxide combined. Preferably, the particulates are approximately spherical in shape.

Optionally, the particulate further comprises a carbon material in electronic contact with the vanadium oxide material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the cathode active material particles and more preferably on the surface of all primary particles, which are than embraced by a graphene sheet or a plurality of graphene sheets.

The following examples serve to provide the best modes of practice for the present invention and should not be construed as limiting the scope of the invention.

EXAMPLE 1

Preparation of Pristine NGPs from Natural Flake Graphite Using Direct Ultrasonication In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 75 W (Branson S450 Ultrasonicator) was used for exfoliation, separation, and size reduction for a period of 1 hour. This procedure was repeated several times, each time with five grams of starting graphite powder, to produce a sufficient quantity of pristine NGPs. The pristine graphene has never been exposed to oxidation and, hence, has an essentially 0% oxygen. In contrast, the graphene sheets obtained by chemically reducing graphene oxide have a typical oxygen content between 1% and 5% by weight.

For the preparation of graphene-enhanced particulates, a desired amount of vanadium oxide material was added to a desired amount of graphene suspension to form a precursor mixture suspension with a solid content of approximately 1-10% by weight. One could choose to first dissolve vanadium oxide in water to produce a solution or gel and then add the solution or gel to the graphene suspension. After thorough mixing in an ultrasonication reactor, the suspension was then spray-dried to form the graphene-enhanced particulates.

EXAMPLE 2

Oxidation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 5.5. The intent was to remove all sulfuric and nitric acid residue out of graphite surfaces. The resulting graphene oxide (GO) suspension was then used in subsequent examples for the preparation of graphene-modified vanadium-based oxide materials.

EXAMPLE 3

Preparation of Graphene-Enabled $Li_xV_3O_8$ Nano-Sheets from $V_2O_5$ and LiOH All chemicals used in this study were analytical grade and were used as received without further purification. $V_2O_5$ (99.6%, Alfa Aesar) and LiOH (99+%, Sigma-Aldrich) were used to prepare the precursor solution. Graphene oxide (GO, 1% w/v obtained in Example 2 above) was used as a structure modifier. First, $V_2O_5$ and LiOH in a stoichiometric V/Li ratio of 1:3 were dissolved in actively stirred de-ionized water at 50° C. until an aqueous solution of $Li_xV_3O_8$ was formed. Then, GO suspension was added while stirring, and the resulting suspension was atomized and dried in an oven at 160° C. to produce the spherical composite particulates of $GO/Li_xV_3O_8$ nano-sheets and the sample was designated NLVO-160-1 (FIG. 1(B)). Corresponding $Li_xV_3O_8$ materials were obtained under comparable processing conditions, but without graphene oxide sheets. The sample was designated as LVO-160-2 (FIG. 2(B)).

Figure 4A:
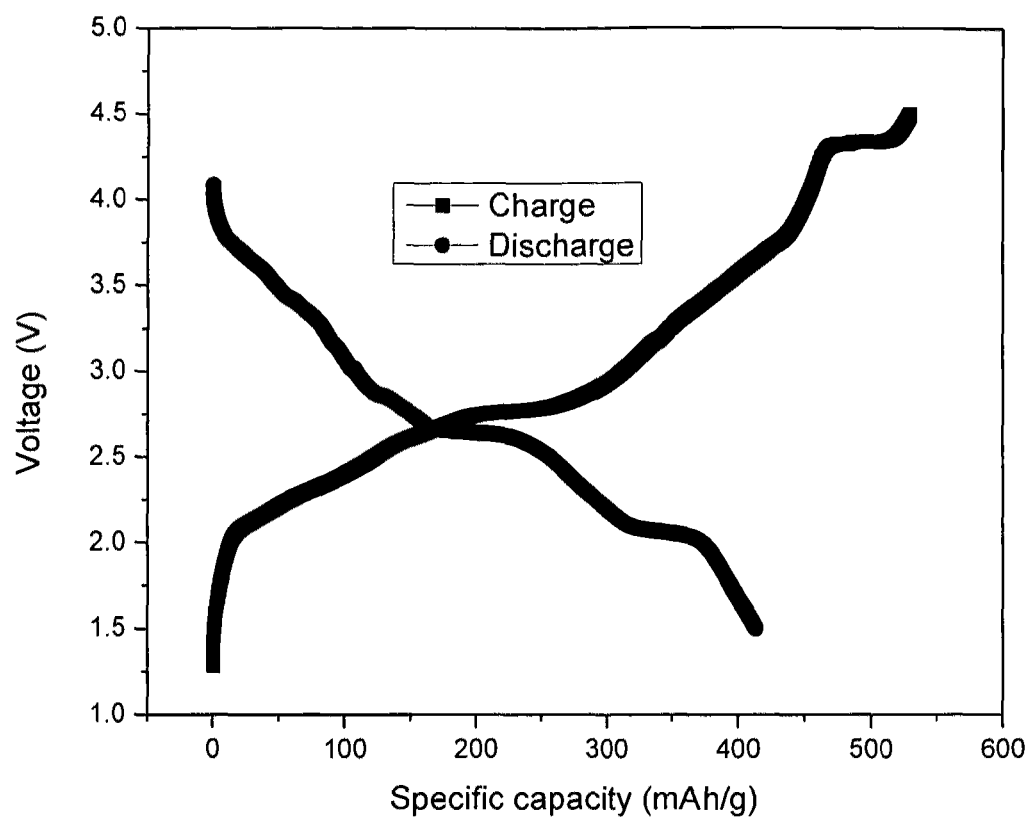
FIG. 4(A) Representative charge-discharge curves of a graphene-enhanced vanadium oxide composite electrode; (B) The Nyquist plots of this composite electrode and its counterpart prepared without the presence of a graphene material.
Figure 4B:
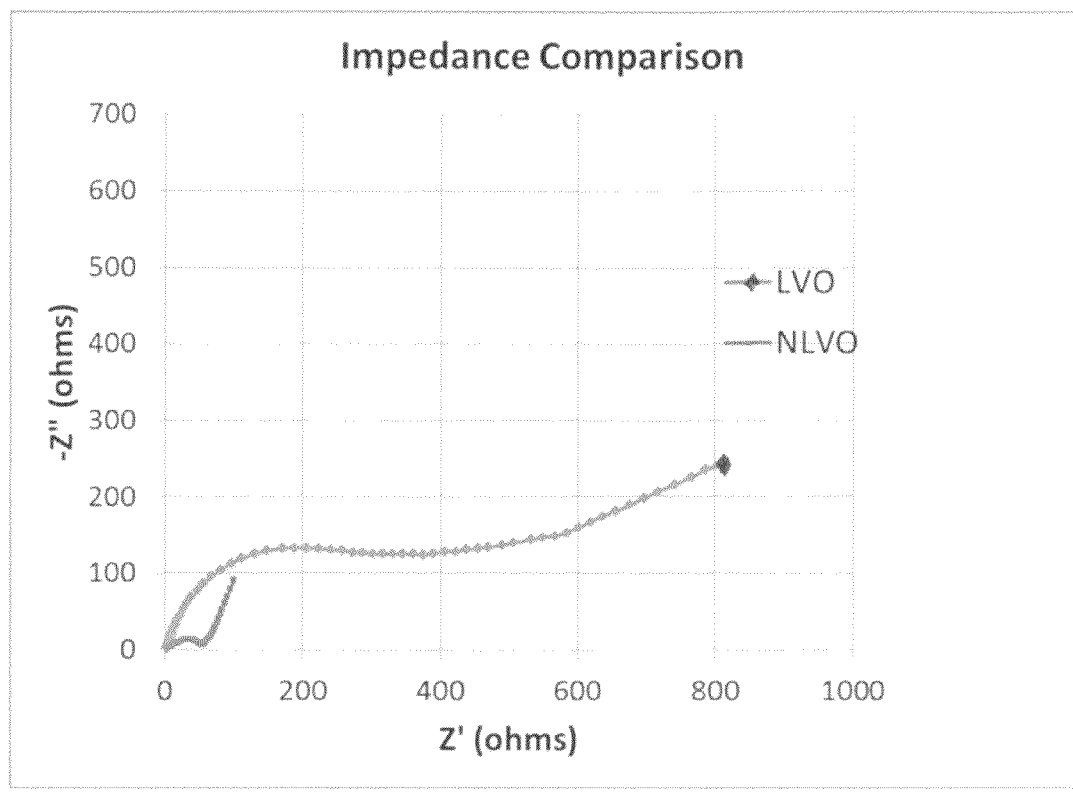

Representative charge-discharge curves of NLVO-160-1 were given in FIG. 4(A), indicating a specific capacity higher than 400 mAh/g. The specific capacity of LVO-160-2 was found to be less than 350 mAh/g. The Nyquist plots (FIG. 4(B)) obtained from electrical impedance tests show a semi-circle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of $Li^+$ in the solid matrix. The values of Rct for the vanadium oxide alone and graphene-enhanced composite electrodes are about 50.0 and 350.0Ω, respectively. Clearly, the Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling.

An additional set of graphene-enabled $Li_xV_3O_8$ nano-sheet composite particulates was produced from $V_2O_5$ and LiOH under comparable conditions, but was dried under different atomization temperatures, pressures, and gas flow rates to achieve four samples of composite particulates with four different $Li_xV_3O_8$ nano-sheet average thicknesses (4.6 nm, 8.5 nm, 14 nm, and 35 nm). A sample of $Li_xV_3O_8$ sheets/rods with an average thickness/diameter of 76 nm was also obtained without the presence of graphene oxide sheets (but, with the presence of carbon black particles) under the same processing conditions for the graphene-enhanced particulates with a nano-sheet average thickness of 35 nm. It seems that carbon black is not as good a nucleating agent as graphene for the formation of $Li_xV_3O_8$ nano-sheet crystals. The specific capacity of these cathode materials was investigated using lithium foil as a counter electrode.

Figure 5A:
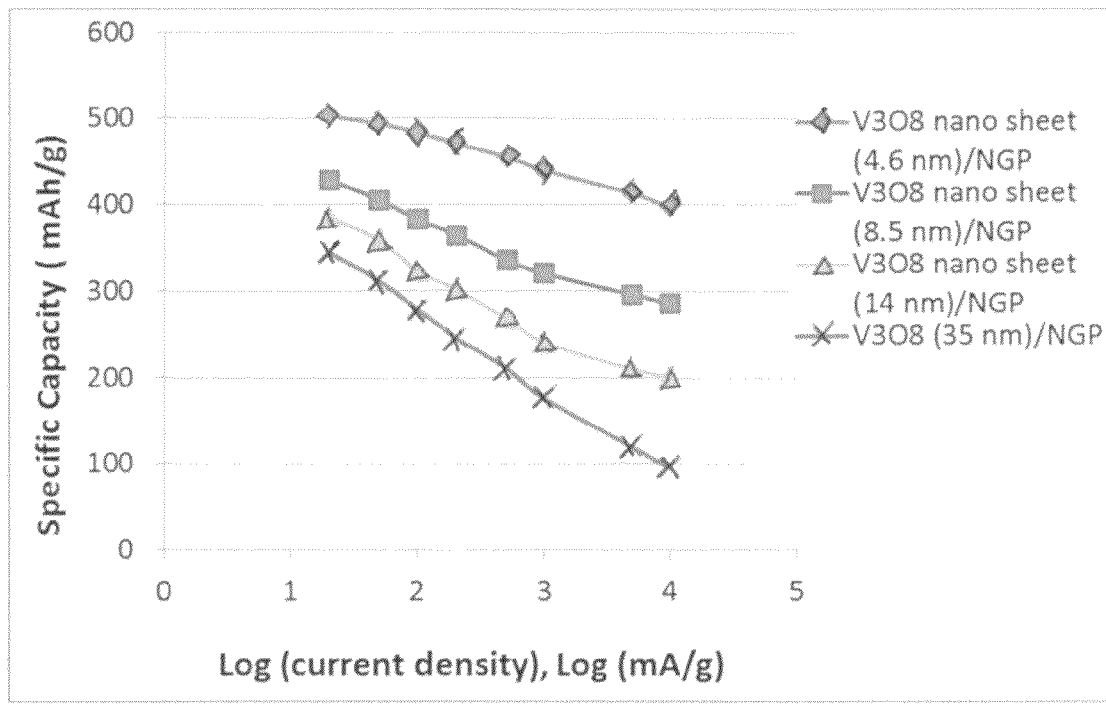
FIG. 5(A) The reversible specific capacity of four graphene-enhanced vanadium oxide composite particulates plotted as a function of the current density for four $Li_xV_3O_8$ nano-sheet thicknesses; (B) The reversible specific capacity of a graphene-enhanced vanadium oxide composite particulate sample, plotted as a function of the current density, and that of a carbon black-modified sample prepared under comparable conditions; (c) The cycling performance of graphene-enhanced vanadium oxide and their graphene-free counterpart.
Figure 5B:
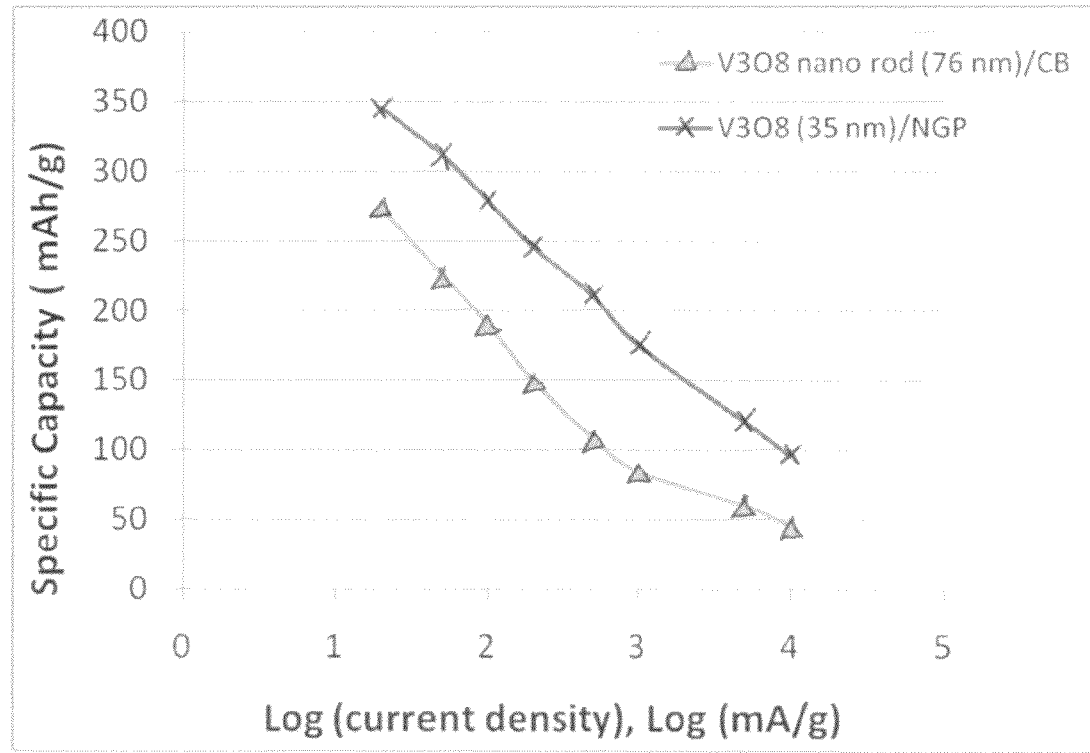

As summarized in FIG. 5(A) and (B), although the reversible specific capacity of all electrode materials is a function of the current density used to test the electrode material (with a lithium foil as a counter-electrode), the presently invented composite compositions with a thinner vanadium oxide nano-sheet exhibit a lower degree of dependence on the current density (a higher current density is equivalent to a higher charge/discharge rate). With an average $Li_xV_3O_8$ nano-sheet thickness of 4.6 nm, the graphene-enhanced composite particulates are still capable of delivering a specific capacity of approximately 400 mAh/g at an extremely high current density of 10,000 mA/g (equivalent to 25 C charge/discharge rate). This is unprecedented, and so far the best cathode capacity of 300 mAh/g or higher had been reported only for current density of <150 mA/g (more typically <100 mA/g, e.g. 20 mA/g as summarized in Table 1 above). With an average $Li_xV_3O_8$ nano-sheet thickness of 8.5 nm, the graphene composite particulates exhibit a high specific capacity of 300 mAh/g at a high current density of 5,000 mA/g (or 5 A/g). This is unheard of and no prior art data even came close. FIG. 5(B) indicates that the graphene-enhanced vanadium oxide composites are significantly superior to the corresponding carbon black-modified vanadium oxide composites prepared under comparable conditions.

Figure 5C:
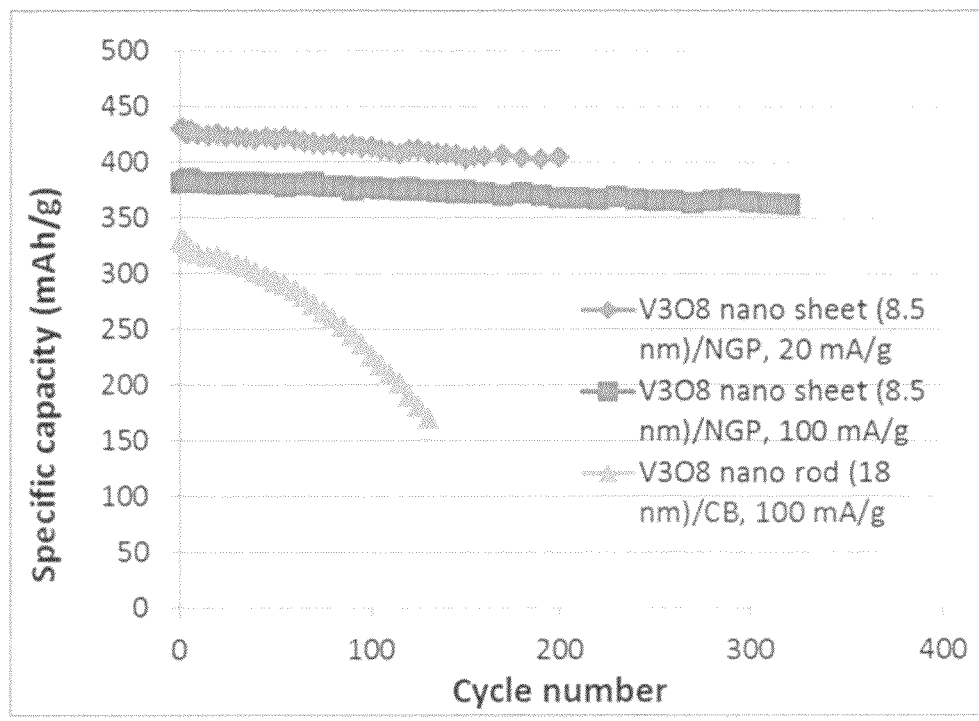

FIG. 5(C) has clearly demonstrated that graphene-enabled vanadium oxide, when used as a lithium cell cathode active material, exhibits exceptional cycling stability, capable of maintaining a specific capacity of 400 mAh/g for 200 cycles at a current density of 20 mA/g and a capacity of 350 mAh/g for 300 cycles at 100 mA/g. This high level of cycling stability is unprecedented for any type of lithium cell cathode active material.

EXAMPLE 4

Preparation of Graphene-Enabled $Li_xV_3O_8$ Nano-Sheets from $V_2O_5$ with Calcination $V_2O_5$ (99.6%, Alfa Aesar), $Li_2CO_3$ (99+%, Sigma-Aldrich), and oxalic acid ($H_2C_2O_4$, 99+%, Sigma-Aldrich) were used to prepare the precursor solution. The oxalic acid was used as both a chelating and a reducing agent, and graphene oxide (GO, 1% w/v obtained in Example 2 above) was used as the structure modifier. First, $V_2O_5$ and oxalic acid in a stoichiometric ratio of 1:3 were dissolved in actively stirred de-ionized water at room temperature until a clear blue solution of $VOC_2O_4$ was formed. Then, a stoichiometric amount of $Li_2CO_3$ was added, and the mixture was vigorously stirred for 1 h. Next, 0.02 g of GO was added drop by drop while stirring. The resulting suspension was spray-dried at 180° C. to produce the dry solid. The as-obtained material was calcined at 450° C. in a quartz tube for 2 h, and the samples obtained were designated G-VO-500-3. Samples without the use of graphene oxide were also prepared under comparable conditions (VO-500-4).

We observed that the thickness of $Li_xV_3O_8$ nano-sheets in G-VO-500-3 was typically in the range of 10-25 nm, but that of VO-500-4 (with no GO) was typically in the range of 20-45 nm. This observation further confirms the notion that graphene-based material is a surprisingly effective heterogeneous nucleating agent for vanadium oxide crystals.

In order to help pin-point some additional reasons why graphene materials have been effective in enhancing the charge/discharge cycling stability of vanadium oxide-based cathodes, we prepared two cells: Li anode/G-VO-500-3 cathode cell and Li anode/VO-500-4 cathode cell. The two cells were separately prescribed to undergo charge/discharge for 100 cycles. After the $100^{th}$ re-charge, the cells were carefully disassembled. The cathode in each cell was removed and weighted. By subtracting the original lithium weight (corresponding toy) in $Li_{y+1}V_3O_8$ in each case, we found that $Li_1V_3O_8$ in VO-500-4 lost 11% of its weight after 100 cycles, but $Li_1V_3O_8$ in VG-O-500-3 only lost 0.2% of its weight. This astonishing observation seems to suggest that graphene has effectively prevented vanadium oxide from getting dissolved in or selectively leached out into the electrolyte. No one has ever reported such an unexpected effect of graphene-based materials. Graphene has not only provided electrical and thermal conductivity to vanadium oxide (which is otherwise a poor conductor), but also the ability to promote heterogeneous nucleation of vanadium oxide crystals and to prevent leaching or dissolution of vanadium oxide in liquid electrolyte.

EXAMPLE 5

Hydrothermal Synthesis of Graphene-Enabled $V_3O_7H_2O$ Nano-belts from $V_2O_5$ and Graphene Oxide In a typical procedure, 0.015 g of $V_2O_5$ was added into 9 ml of distilled water. A GO-water suspension ($V_2O_5$/GO ratio of 98/2) was poured into the $V_2O_5$ suspension. The resulting mixture was transferred to a 35 ml Teflon-sealed autoclave and stored at 180-200° C. for 24-36 h (different batches), then was air-cooled to room temperature. GO was used as a heterogeneous nucleation agent to promote fast nucleation of larger numbers of nuclei for reduced crystallite sizes (promote nucleation against growth of crystals). The products were washed several times with distilled water, and finally dried at 60° C. in an oven.

A second batch was obtained by spray-drying at 200° C. and heat-treated at 400° C. for 2 hours to obtain particulates of GO/$V_3O_7$ $H_2O$ composite with graphene oxide sheets embracing around these particulates. For comparison purposes, a third batch of $V_3O_7$ $H_2O$ was prepared without using GO (oven dried), a fourth batch was prepared with GO and poly ethylene oxide (1% PEO in water was added to the GO suspension, then spray-dried and heat-treated at 400° C. for 2 hours), and a fifth batch was prepared with PEO (1% in water, but without GO) via spray-drying, followed by heat-treating at 400° C. for 2 hours. Heat treatment of PEO at 400° C. serves to convert PEO to a carbon material.

Figure 6:
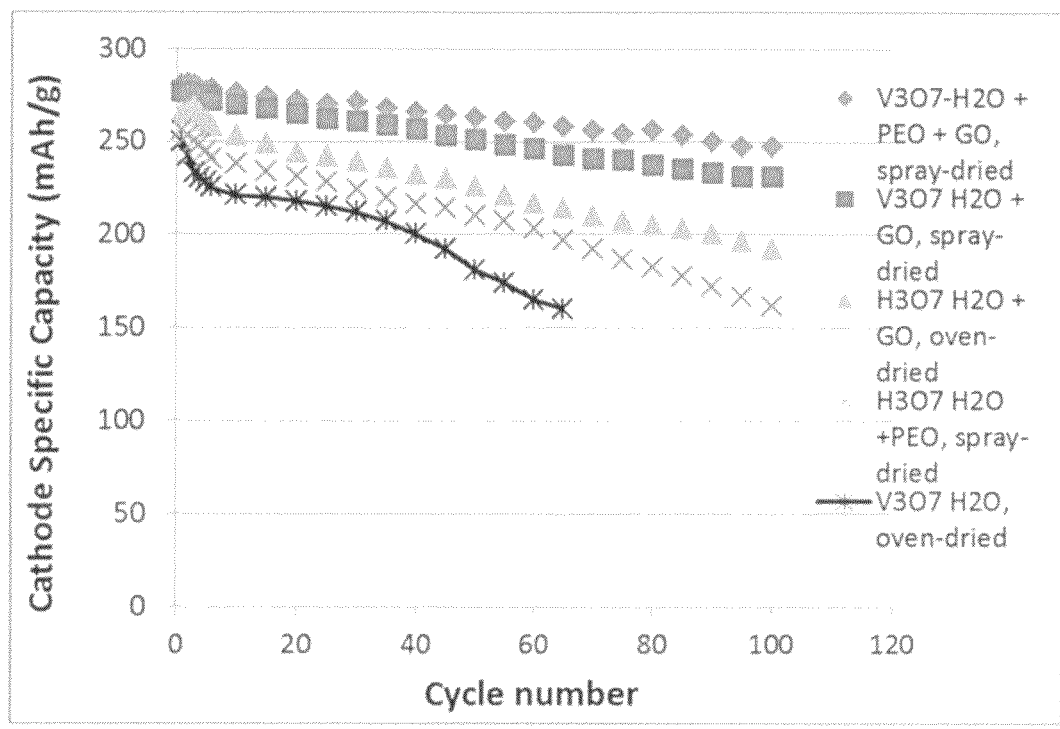
FIG. 6 The specific capacity of various $V_3O_7$ $H_2O$-based electrodes ($V_3O_7$ $H_2O$ alone; GO/$V_3O_7$ $H_2O$ laminar composite prepared via oven drying; GO/$V_3O_7$ $H_2O$ spherical composite particulates prepared via spray-drying; PEO-derived carbon/$V_3O_7$ $H_2O$ spherical composite particulates prepared via spray-drying; and combined GO-carbon/$V_3O_7$ $H_2O$ spherical composite particulates prepared via spray-drying. Carbon phase was produced by thermally converting poly ethylene oxide (PEO), which is a water-soluble polymer.

The specific capacity of these electrodes was measured as a function of the cycle number using lithium foil as a counter electrode in a button cell configuration. The results are summarized in FIG. 6, from which one can make several significant observations: (a) Compared with $V_3O_7H_2O$ alone, the GO/ $V_3O_7H_2O$ electrode exhibits a higher initial specific capacity and significantly improved cycling stability; (b) Compared with $V_3O_7H_2O$ alone, the carbon-modified $V_3O_7H_2O$ electrode (with PEO being carbonized) exhibits a higher initial specific capacity and improved cycling stability, but this improvement is not as significant as in the graphene-modified version; (c) Co-existence of graphene sheets and a carbon phase appears to provide an unexpected synergistic effect, significantly superior to the performance of the $V_3O_7$ $H_2O$ electrodes with graphene or carbon alone. Not wishing to be limited by theory, but it seems that graphene serves as an effective nucleating agent to significantly reduce the $V_3O_7H_2O$ crystal sizes (thereby reducing the lithium ion diffusion distance), and graphene sheets, in combination with carbon (PEO converted to nano carbon particles), serve to separate vanadium oxide sheets (preventing sheets from overlapping one another) and maintain a space or pores between two vanadium oxide sheets or between a graphene sheet and a vanadium oxide sheet to accommodate liquid electrolyte. Liquid electrolyte accessibility is essential to achieving high capacity and high-rate capability.

EXAMPLE 6

Hydrothermal Synthesis of Graphene-Enabled $Li_xV_2O_5$ Nano-belts from $V_2O_5$, LiCl, and Graphene Oxide In a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1), with or without mixing by a GO suspension, were placed in a Teflon-lined stainless steel 35 ml autoclave, sealed, and heated up to 180° C. for 8-24 h. After such a hydrothermal treatment, the green solids were collected, thoroughly washed, optionally ultrasonicated, and dried at 70° C. for 12 h followed by either (a) drying at 200° C. under vacuum overnight to obtain paper-like lamella composite structures or (b) mixing with another 0.1% GO in water, ultrasonicating to break down nano-belt sizes, and then spray-drying at 200° C. to obtain graphene-embraced composite particulates.

Table 2 below provides a summary of the processing conditions, morphology, thickness, and properties of the samples prepared in this example. These data demonstrate that graphene-enhanced $Li_xV_2O_5$ nano-belts exhibit superior first-cycle capacity and cycling stability to their non-graphene counterparts. Also, the spherical particulate morphology appears to provide a better performance as compared to the laminar composite.

TABLE 2

Processing/synthesis conditions, morphology, thickness, and properties of the samples orepared in Example 6.

| Sample ID | Synthesis/Processing | Morphology/Thickness | 1st-cycle Capacity (mAh/g) at 100 mA/g | Specific capacity after (n) cycles |
|---|---|---|---|---|
| VO-10 | Hydrothermal at 180° C. for 24 h; 200° C. vacuum oven drying | Nano-belts 3-8 μm long, 200 nm wide, and 15-25 nm thick | 350 | 243 (100 cycles) |
| GVO-11 | Hydrothermal with GO at 180° C. for 24 h; 200° C. vacuum oven drying (paper-like composite) | Nano-sheets 100-200 long, 30-50 nm wide, and 5-10 nm thick | 405 | 345 (150 cycles) |
| VO-12 | Hydrothermal at 180° C. for 24 h; sonication, 200° C. spray drying | Nano-belts 0.5-1 μm long, 200 nm wide, and 12-20 nm thick | 365 | 265 (100 cycles) |
| GVO-13 | Hydrothermal with GO at 180° C. for 24 h; sonication, 200° C. spray drying (composite particulates) | Nano-sheets 50-100 nm long, 30-50 nm wide, average thickness <5 nm | 467 | 420 (150 cycles) |

EXAMPLE 7

Preparation of Cu-Doped $V_2O_5$ and GO-Enabled Cu-Doped $V_2O_5$ Composites Cu-doped $V_2O_5$ was prepared by using $V_2O_5$ and Cu$(NO_3)_2 \cdot 2.5H_2O$ (98%, Aldrich) as starting materials. In a typical procedure, the first step involved adding 0.02 mol of $V_2O_5$ into 100 ml water, followed by slowly dropping ammonia water under constant stirring to obtain a yellowish solution. This was followed by adding 0.001 mol of Cu$(NO_3)_2$ to and dissolving in the above solution. The solution pH value was adjusted to 8.5 by addition of ammonia water. The formed precipitate was filtered and washed to neutral pH, then dried at 100° C. for 3 h. This solid precursor was then subjected to calcinations at 600° C. for 5 h at the ambient condition to obtain the final product of Cu-doped $V_2O_5$.

The Cu-doped $V_2O_5$ powder was subjected to manual grinding and then ball-milling for two hours to reduce the particle size to slightly below 100 nm. A selected amount of powder was then dispersed in water containing 0.1% graphene oxide and the resulting mixture was subjected to ultrasonication to facilitate more uniform dispersion. The suspension was then subjected to spray-drying to obtain GO-enabled, Cu-doped $V_2O_5$ particulates.

EXAMPLE 8

Preparation of Graphene-Enhanced Mn-doped $V_2O_5$ Composite Particulates

In a typical procedure, vanadium oxide sol was prepared by dissolving 0.136 g $V_2O_5$ powder (Alfa Aesar) in 2.0 ml de-ionized water and 0.603 ml 30% $H_2O_2$ solution at room temperature. The suspension was stirred vigorously until $V_2O_5$ was completely dissolved and a clear dark red solution was obtained. The solution was then sonicated to obtain a yellow-brown gel, which was dispersed into 150 ml de-ionized water to obtain colloidal dispersion of hydrated vanadium oxide nanoparticles at a molar concentration of 0.005 mol/L and pH of 3.0.

To obtain Mn-doped vanadium oxide sol, an appropriate amount (1.67%) of Mn$(Ac)_2$-$4H_2O$ (Alfa Aesar) was added into $V_2O_5$ sol prepared by the aforementioned procedure. GO-water solution was added to both Mn-doped $V_2O_5$ and un-doped $V_2O_5$ separately and then the mixtures were spray-dried at 200° C. The resulting graphene oxide-embraced Mn-doped $V_2O_5$ and un-doped $V_2O_5$ were then annealed at 250° C. in air for 3 h.

The first-cycle and $100^{th}$ cycle specific capacity of graphene-enhanced Mn-doped $V_2O_5$, graphene-free Mn-doped $V_2O_5$, graphene-enhanced un-doped $V_2O_5$, and graphene-free un-doped $V_2O_5$, was summarized in Table 3 below. These data indicate that co-existence of GO and Mn during $V_2O_5$ processing provides the best electrochemical performance. It seems that GO helps to reduce the $V_2O_5$ crystal sizes and Mn helps to stabilize these small crystals. Without Mn, these small crystals would have a higher tendency to undergo phase changes during lithium insertion and de-insertion. Indeed, graphene and Mn work hand-in-hand to impart superior properties to $V_2O_5$ electrodes.

TABLE 3

Cycling performance of various electrodes prepared in Example 8.

| Sample ID | Material composition | 1st-cycle Capacity (mAh/g) at 100 mA/g | Specific capacity after (n) cycles |
|---|---|---|---|
| 1 | Graphene-free, un-doped $V_2O_5$ | 270 | 163 (100 cycles) |
| 2 | Graphene-enhanced, un-doped $V_2O_5$ | 320 | 286 (100 cycles) |
| 3 | Graphene-free, Mn-doped $V_2O_5$ | 282 | 225 (100 cycles) |
| 4 | Graphene-enhanced, Mn-doped $V_2O_5$ | 343 | 319 (100 cycles) |

Cu and Mn represent two of the many dopants that can be used to modify the vanadium oxide structures and properties. The dopant may be selected from the group consisting of alkali metals, alkaline earth metals, transition metals, other metals selected from Al, Ga, In, Sn, Pb, and Bi, metalloids selected from B, Si, Ge, As, Sb, and Te, halogens, and other non-metals selected from C, N, P, S, and Se.

In summary, the present invention has provided a graphene-enabled vanadium oxide-based cathode active material that:

(1) Consistently exhibits a combination of excellent properties (e.g. specific capacity, capacity retention, and good capacity at high rates, not just one type of good property).

(2) Exhibits a high first-cycle capacity (e.g. >300 mAh/g) and an ability to maintain a high capacity for a long cycle life (e.g. >90% retention in >100 charge/discharge cycles or >80% retention in >200 cycles.

(3) Exhibits a high specific capacity even at a high C rate (e.g., >400 mAh/g at 1 C, >350 mAh/h at 2.5 C, and/or >300 mAh/g at >10 C). These high specific capacities at such high charge/discharge rates have not been achieved in the lithium-ion battery industry.

(4) Exhibits a nano-structure (nano-particle, nano-rod, nano-wire, nano-tube, nano-sheet, or nano-belt) that has a dimension (e.g. average thickness) smaller than 10 nm and, in some cases, smaller than 5 nm. Graphene-based materials appear to be powerful heterogeneous nucleating agents for vanadium oxide crystals.

(5) Is a composite material, more thermally and electrically conductive than the corresponding vanadium oxide alone.

(6) Is composed of multiple primary particles of vanadium oxide that, in combination with graphene, graphene oxide, or graphene fluoride sheets and an optional carbon material, are aggregated into secondary particles (herein referred to as composite particulates) that are more amenable to the production of cathodes having a good tap density using current production equipment. This is significant since it is very difficult to fabricate electrodes directly from primary nano-scaled particles of electrode-active materials. Also, non-spherical particles normally lead to electrodes with a low tap density (electrode weight/electrode volume). In other words, the tap density of the presently invented composite material is higher than that of vanadium oxide particles when used alone (without graphene or graphene oxide) in an electrode.

(7) Contains a conductive additive or modifier capable of helping multiple primary particles of a vanadium oxide material aggregate into secondary particles that contain a 3-D network of electron-conducting paths, imparting exceptional conductivity to the cathode, and enabling the cathode to become high-rate capable.

(8) Is more resistant against leaching or dissolution of vanadium oxide ingredients in liquid electrolyte as compared with vanadium oxide without graphene sheets.

These features and advantages, individually or in combination, have never been taught or even slightly hinted in the prior art.

The invention claimed is:

1. A nano graphene-enabled vanadium oxide composite composition for use as a lithium battery cathode active material, wherein said composite composition is formed of one or a plurality of graphene fluoride or graphene oxide sheets or platelets and a plurality of nano-particles, nano-rods, nano-wires, nano-tubes, nano-sheets, and/or nano-belts of a vanadium oxide with a size smaller than 100 nm, wherein said graphene fluoride or graphene oxide sheets or platelets have a thickness in the range of 0.34 nm-20 nm and are in an amount of from 0.01% to 50% by weight based on the total weight of graphene fluoride or graphene oxide and the vanadium oxide combined, and wherein said vanadium oxide is selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

2. The composite composition of claim 1 wherein said nano-particles, nano-rods, nano-wires, nano-sheets, and/or nano-belts of a vanadium oxide have a size smaller than 5 nm.

3. The composite composition of claim 1 wherein said vanadium oxide is in a form of nano-sheet or nano-belt having a thickness smaller than 5 nm.

4. The composite composition of claim 1 wherein said nano-particles, nano-rods, nano-wires, nano-sheets, and/or nano-belts of a vanadium oxide have an average thickness or diameter smaller than 10 nm.

5. The composite composition of claim 4 wherein said doped versions contain a dopant selected from the group consisting of alkali metals, alkaline earth metals, transition metals, other metals selected from Al, Ga, In, Sn, Pb, and Bi, metalloids selected from B, Si, Ge, As, Sb, and Te, halogens, and other non-metals selected from C, N, P, S, and Se.

6. The composite composition of claim 4 wherein said vanadium oxide is $Li_xV_2O_5$ or $Li_xV_3O_8$, containing a dopant selected from the group consisting of alkali metals, alkaline earth metals, transition metals, other metals selected from Al, Ga, In, Sn, Pb, and Bi, metalloids selected from B, Si, Ge, As, Sb, and Te, halogens, and other non-metals selected from C, N, P, S, and Se.

7. The composite composition of claim 4 wherein said graphene fluoride or graphene oxide comprises single-layer or few-layer graphene fluoride or graphene oxide, wherein said few-layer graphene fluoride or graphene oxide is defined as a platelet formed of less than 10 graphene planes.

8. The composite composition of claim 4, further comprising a carbon material in electronic contact with said vanadium oxide and a graphene fluoride or graphene oxide sheet.

9. The composite composition of claim 4, further comprising a carbon material coated on vanadium oxide, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

10. The composite composition of claim 4 wherein said graphene oxide has an oxygen content less than 25% by weight.

11. The composite composition of claim 4 wherein said graphene oxide has an oxygen content less than 5% by weight.

12. A lithium battery cathode comprising said composite composition of claim 4 as a cathode active material.

13. A lithium battery cathode comprising said composite composition of claim 4 as a cathode active material, wherein said active material exhibits a specific capacity greater than 400 mAh/g for more than 100 charge/discharge cycles.

14. A lithium battery cathode comprising said composite composition of claim 4 as a cathode active material, wherein said active material exhibits a specific capacity greater than 300 mAh/g for more than 200 charge/discharge cycles.

15. A lithium battery cathode comprising said composite composition of claim 4 as a cathode active material, wherein said active material exhibits a specific capacity greater than 200 mAh/g when measured at a current density of no less than 10 A/g or a charge/discharge rate of no less than 10 C.

16. A lithium battery cathode comprising said composite composition of claim 4 as a cathode active material, wherein said active material exhibits a specific capacity greater than 300 mAh/g when measured at a current density of no less than 10 A/g or a charge/discharge rate of no less than 10 C.

17. A lithium battery cathode comprising composite composition of claim 7 as a cathode active material.

18. A lithium battery cathode comprising composite composition of claim 8 as a cathode active material.

19. A lithium battery cathode comprising composite composition of claim 9 as a cathode active material.

20. A lithium battery cathode comprising multiple particles of nano graphene-enabled vanadium oxide composite composition as a cathode active material, wherein said composite composition is formed of one or a plurality of graphene, graphene fluoride, or graphene oxide sheets or platelets and a plurality of nano-particles, nano-rods, nano-wires, nano-tubes, nano-sheets, and/or nano-belts of a vanadium oxide with a size smaller than 100 nm, wherein said graphene, graphene fluoride, or graphene oxide sheets or platelets have a thickness in the range of 0.34 nm-20 nm and are in an amount of from 0.01% to 50% by weight based on the total weight of graphene, graphene fluoride, or graphene oxide and the vanadium oxide combined, and wherein said composite composition is prepared by precipitating vanadium oxide from a water or solvent solution containing a vanadium oxide or a vanadium oxide precursor and a graphene, graphene fluoride, or graphene oxide sheet dissolved or dispersed therein, and wherein said vanadium oxide and graphene, graphene oxide, or graphene fluoride sheets are mutually bonded or agglomerated into a composite particulate containing both embracing and internal sheets of graphene, graphene fluoride, or graphene oxide with at least a graphene, graphene fluoride, or graphene oxide sheet embracing said particulate, and wherein said particulate has an electrical conductivity no less than $10^{-4}$ S/cm and wherein said multiple composite particulates are packed together with graphene sheets forming a three-dimensional electron-conducting pathway.

21. The lithium battery cathode of claim 20 wherein said cathode active material further comprises a carbon material coated on vanadium oxide, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

22. A lithium battery comprising an anode, a cathode of claim 12, a separator disposed between the anode and the cathode, and electrolyte in physical contact with both the anode and the cathode.

23. A lithium battery comprising an anode, a cathode of claim 17, a separator disposed between the anode and the cathode, and electrolyte in physical contact with both the anode and the cathode.

24. A lithium battery comprising an anode, a cathode of claim 18, a separator disposed between the anode and the cathode, and electrolyte in physical contact with both the anode and the cathode.

25. A lithium battery comprising an anode, a cathode of claim 19, a separator disposed between the anode and the cathode, and electrolyte in physical contact with both the anode and the cathode.

26. A lithium battery comprising an anode, a cathode of claim 20, a separator disposed between the anode and the cathode, and electrolyte in physical contact with both the anode and the cathode.

27. A lithium battery comprising an anode, a cathode of claim 21, a separator disposed between the anode and the cathode, and electrolyte in physical contact with both the anode and the cathode.

* * * * *